April 29, 1969  A. S. HIRSCHOWITZ  3,441,711
ELECTRIC HEATER PLUG FOR WATER SYSTEMS
Filed April 11, 1966
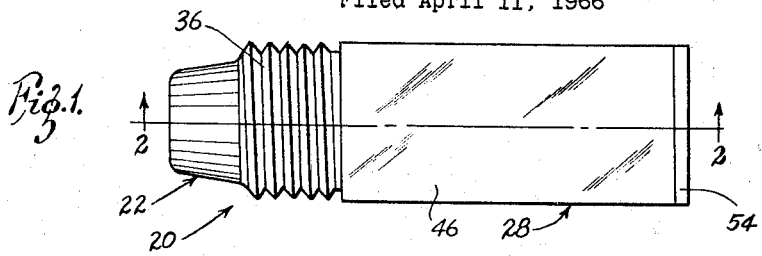
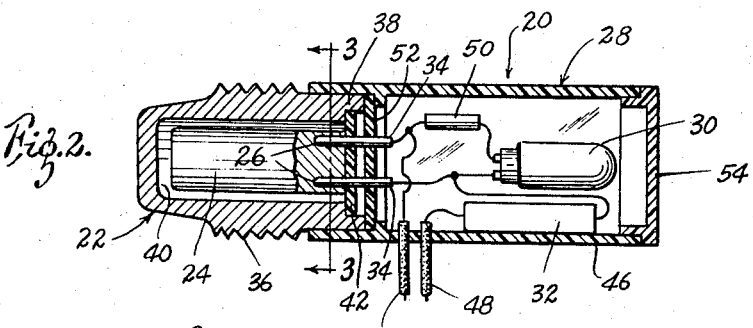
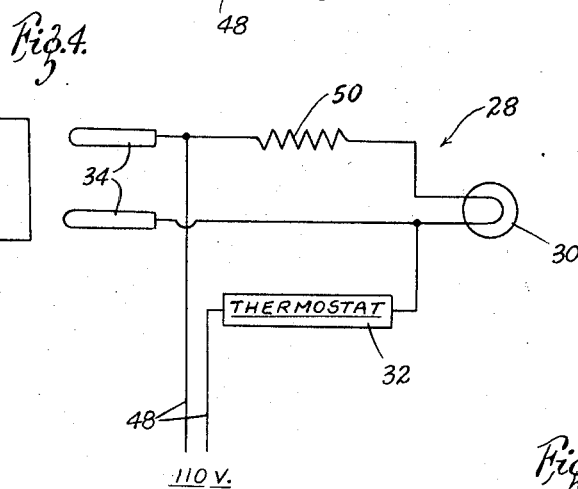
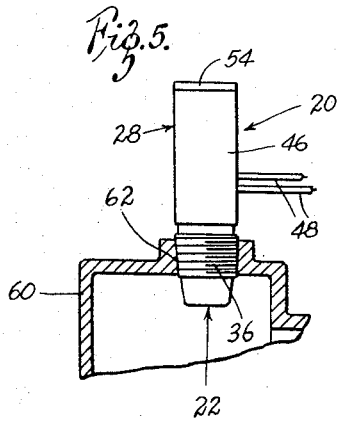
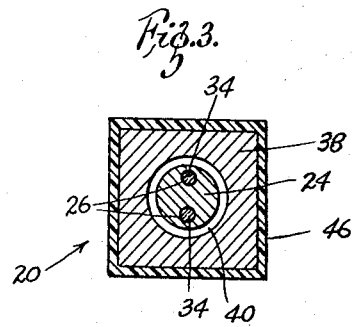
INVENTOR:
ABRAM S. HIRSCHOWITZ,
BY Kingsland, Rogers, Ezell, Eilers & Robbins
ATTORNEYS

United States Patent Office 3,441,711
Patented Apr. 29, 1969

3,441,711
ELECTRIC HEATER PLUG FOR WATER SYSTEMS
Abram S. Hirschowitz, Oran, Mo. 63771
Filed Apr. 11, 1966, Ser. No. 541,741
Int. Cl. H05b *3/06;* F24h *1/18*
U.S. Cl. 219—328                                                          1 Claim

ABSTRACT OF THE DISCLOSURE

A drain plug or the like for use with water tanks or other water containers provided with means for preventing freezing. The drain plug has a cavity receiving an electrical heating element and a socket receiving a housing containing a thermostat and a visual light bulb warning system indicating actuation of the heating element upon energization. The housing can simply be removed from the drain plug through the socket arrangement in the absence of cold weather conditions.

---

By means of this invention there has been provided a drain plug for water systems, such as pumps, tanks, and the like, which may be used as such in its conventional operation, and also employed during cold weather periods as a heating element to provide heat to the water contents of the system. The plug is provided with a heating element and thermostat control means to energize the heating element when the temperature falls below a predetermined level, such as 32° F. The invention contemplates a plug having a built-in heating element with electrical connection means to receive a source of current. By means of the electrical connection feature, a separate unit incorporating the thermostat and a warning bulb to indicate energization can be plugged in to the plug. Thus, the plug may be used in the summer months in conventional fashion and employed with the plug in thermostat and warning light with leads to connect it to a source of electrical power when cold weather warrants its employment.

The plug and heating element of this invention may be used in conventional water systems of one type or another to prevent freezeup and can be employed without any elaborate electrical connections and at a very low cost. Thus, it may be used as a prime plug in a pump to warm the water in the pump head and be removed only when the pump needs priming. It may also be used on the drain side of the pump to provide the same heating function. In other uses where a house trailer connects to an outside water source the heater plug may be inserted into a T connection between the trailer outlet and the water supply to keep the pipes from freezing. The installation is simple and can be effected in a matter of seconds and through its ruggedness and economy can be used in a wide variety of installations.

The above features are objects of this invention and further objects will appear in the detailed description which follows and will be otherwise apparent to those skilled in the art.

For the purpose of illustration of this invention, there is shown in the accompanying drawings a preferred embodiment. It is to be understood that these drawings are for the purpose of illustration only, however, and that the invention is not limited thereto.

In the drawings:

FIGURE 1 is a plan view of the drain plug connected to the plug-in light and thermostat electrical connecting unit;

FIGURE 2 is a view in vertical section taken on the line 2—2 of FIGURE 1;

FIGURE 3 is a view in section taken on the line 3—3 of FIGURE 2;

FIGURE 4 is a schematic electrical diagram showing the circuitry employed; and

FIGURE 5 is a fragmentary view partially in section through the prime plug opening of a water pump head in which the drain plug of this invention may be employed.

Referring now to the drawings, the plug with the heating means and thermostat control of this invention is generally designated by the reference numeral 20. It is comprised of a plug portion 22, provided with a heating element 24, and a socket 26. The actuating and thermostat control unit with the warning system is generally indicated by the reference numeral 28, and this portion includes a warning light 30, thermostat 32, and bayonet electrical connecting plugs 34.

The plug 22 has a conventional external construction in that it is provided with a threaded portion 36 and a rectangular end section 38, which is adapted to receive a wrench or the like for removal from the water system in which it is to be inserted. The electrical heating element 24 is positioned within a cavity 40 provided in the interior of the plug and is held in place by means of a plate 42. A female electrical socket 26 is provided within the end of the heating element 24.

The auxiliary unit 28 is comprised of a housing 46 to receive the electrical components, including the electrical leads 48. The electrical leads 48 are adapted to be connected to an electric plug to plug into a conventional source of AC current, as will be readily understood. The housing 46 receives the thermostat 32 and the warning lamp 30, which are connected in parallel to the leads 48. A resistor 50 is provided for the lamp to control the current to it. The bayonet electrical plugs 34 are held in the housing by means of a support plate 52, and, as shown in FIGURE 2, are adapted to mate in the electrical socket provided in the heating element. The housing is additionally provided with a clear, e.g. translucent or transparent plastic end plate 54 to provide for visual inspection of the lamp by an observer to see whether the unit is on or off. The thermostat may conventionally be preset for actuation at 32° F., and to deactuate at 40° F. to insure proper heating and to prevent freezeup.

The plug is shown, for purpose of example only, in installation in FIGURE 5 in the head 60 of a conventional water pump provided with an internally threaded prime plug opening 62. The plug is received within the opening 62 in conventional fashion.

The plug portion 22 of this invention is adapted to be used in conventional fashion. With the auxiliary unit 28 removed, it is simply threaded into the plug opening 62 of the water system, whether it be a pump head 60, for example, or other type of water system, and it is tightened by placing a wrench on the rectangular end portion 38. After it it drawn up tight, it may be used during the summer months in conventional fashion and removed only when needed.

In cold weather periods, the auxiliary unit 28 is inserted into the plug by properly positioning the bayonet elements 34 into the socket 26 of the drain plug. After this has been accomplished, the electrical leads 48 are connected to a source of electrical power and the unit is ready for use. When the cold weather is at 32° F., and below, the thermostat 32 will actuate and connect the circuit through the electrical connectors to the heating element 24. The heating element 24 draws a low power and will provide a source of heat to the interior of the water system, such as the pump head 60, to prevent freezeup. During the operation, while the temperature remains below 40° F., the circuit will remain closed and the lamp 30 will remain lit. To insure operation, an observer may see the lamp when it is illuminated by sighting through the transparent end plate 54. Should for any reason the lamp go out while the weather is cold, the observer can readily determine that the unit may not be functioning and can check the cause of any trouble involved.

Through the use of the auxiliary unit, it will be understood that the same plug with the heating element may be employed with additional auxiliary units should for any reason one auxiliary unit fail, and, likewise, should a heating element fail the auxiliary unit can be used with other plugs provided with the heating element construction of this invention. The entire operation of connecting the auxiliary unit to the plug takes simply a matter of seconds, and, accordingly, a very rapid hookup may be effected, and, likewise, a very rapid dismantling can be realized when the auxiliary unit is desired to be removed during the summer months.

Various changes and modifications may be made within this invention as will be readily apparent to those skilled in the art. Such changes and modifications are within the scope and teaching of this invention as defined by the claims appended hereto.

What is claimed is:

1. A metallic plug for use with water systems and provided with means for preventing freezing, said plug comprising an electrical heating element and thermostat means responsive to the temperature for energizing and de-energizing the heating element, the plug comprising an exteriorly theaded plug portion having an end receivable within a threaded plug opening of a water system and an opposite end having a cross-section to receive a wrench and a detachable housing telescopically engageable with said opposite end containing the thermostat means, said plug portion having a cavity receiving the electrical heating element and a socket at said opposite end, said housing being provided with connector means engageable in said socket and visual means provided in the housing to indicate actuation of the thermostat, said means comprising a light bulb in a circuit controlled by said thermostat, said thermostat housing having a sleeve portion complementary with the wrench portion of the plug and having a translucent end wall, said thermostat being set for actuation at 32° F. and reactivation at 40° F. at ambient temperatures.

References Cited

UNITED STATES PATENTS

| | | | |
|---|---|---|---|
| 1,750,907 | 3/1930 | Skold | 219—523 X |
| 1,994,909 | 3/1935 | Ehrgott | 219—437 |
| 2,000,826 | 5/1935 | Davies | 219—338 |
| 2,247,414 | 7/1941 | Stewart. | |
| 2,479,587 | 8/1949 | Morris et al. | 219—512 |
| 2,480,827 | 9/1949 | Armstrong. | |
| 2,731,529 | 1/1956 | Leins | 200—136.5 X |

FOREIGN PATENTS

| | | |
|---|---|---|
| 1,381,712 | 1/1964 | France. |
| 603,191 | 6/1948 | Great Britain. |
| 123,296 | 11/1927 | Switzerland. |

ANTHONY BARTIS, *Primary Examiner.*